(12) United States Patent
Hermann

(10) Patent No.: US 10,052,960 B2
(45) Date of Patent: Aug. 21, 2018

(54) CIRCUIT FOR PULSE DUTY FACTOR LIMITATION IN A SWITCH MODE REGULATOR, AND METHOD FOR OPERATING A SWITCH MODE REGULATOR

(71) Applicant: Robert Bosch GmbH, Stuttgart (DE)

(72) Inventor: Carsten Hermann, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 270 days.

(21) Appl. No.: 14/915,011

(22) PCT Filed: Jul. 9, 2014

(86) PCT No.: PCT/EP2014/064666
§ 371 (c)(1),
(2) Date: Feb. 26, 2016

(87) PCT Pub. No.: WO2015/032529
PCT Pub. Date: Mar. 12, 2015

(65) Prior Publication Data
US 2016/0207405 A1    Jul. 21, 2016

(30) Foreign Application Priority Data
Sep. 5, 2013   (DE) .......................... 10 2013 217 730

(51) Int. Cl.
*B60L 11/18*   (2006.01)
*H02M 3/156*   (2006.01)
(Continued)

(52) U.S. Cl.
CPC ............. *B60L 11/18* (2013.01); *H02M 3/156* (2013.01); *H02M 3/158* (2013.01); *H02M 1/14* (2013.01); *H02M 2001/0006* (2013.01)

(58) Field of Classification Search
CPC ....................................................... B60L 11/18
(Continued)

(56) References Cited

U.S. PATENT DOCUMENTS

| 5,627,460 | A |   | 5/1997 | Bazinet |
| 5,747,976 | A | * | 5/1998 | Wong .................... H02M 3/156 |
|           |   |   |        | 323/282 |

FOREIGN PATENT DOCUMENTS

| CN | 1750373 A | 3/2006 |
| CN | 101542894 A | 9/2009 |
| DE | 10 2011 104 441 A1 | 12/2012 |

OTHER PUBLICATIONS

International Search Report for PCT/EP2014/064666, dated Sep. 25, 2014.

* cited by examiner

*Primary Examiner* — Joseph Chang
(74) *Attorney, Agent, or Firm* — Norton Rose Fulbright US LLP; Gerard Messina

(57) ABSTRACT

A circuit for pulse duty factor limitation in a switch mode regulator, having an output stage to which control is applied by a signal, is described, in which circuit a pulse duty factor limiter is connected to the switch mode regulator in order to transfer the signal to the pulse duty factor limiter; the pulse duty factor limiter is configured to generate from the signal a limited signal limited at the top end in terms of pulse duty factor; and the pulse duty factor limiter is connected to the output stage in order to transfer the limited signal to the output stage. Also proposed is a method for operating a switch mode regulator having a downstream circuit to which control is applied by a signal of the switch mode regulator and having a capacitor that becomes charged when the downstream circuit is switched off, in which method the pulse duty factor of the signal is limited at an upper limit
(Continued)

value in such a way that a predetermined charging time for the capacitor is available.

11 Claims, 3 Drawing Sheets

(51) Int. Cl.
    *H02M 3/158*     (2006.01)
    *H02M 1/14*     (2006.01)
    *H02M 1/00*     (2006.01)

(58) Field of Classification Search
    USPC .......................................................... 307/10.1
    See application file for complete search history.

CIRCUIT FOR PULSE DUTY FACTOR LIMITATION IN A SWITCH MODE REGULATOR, AND METHOD FOR OPERATING A SWITCH MODE REGULATOR

FIELD

The present invention relates to a circuit for pulse duty factor limitation in a switch mode regulator, to a method for operating a switch mode regulator, and to a motor vehicle having a circuit for pulse duty factor limitation in a switch mode regulator.

BACKGROUND INFORMATION

Signals such as clock signals or pulse width modulated (PWM) signals have a pulse duty factor, which is also called a "duty cycle." The pulse duty factor defines the ratio between the pulse duration, i.e., the active signal portion, and the period length of the signal. The non-active signal portion can also be referred to as an "off-time."

When a switch mode regulator is operated as a down converter, a pulse duty factor that ideally corresponds to the ratio between the output voltage and input voltage occurs. For example, when an output voltage of 6 V is generated from an input voltage of 14 V, the resulting pulse duty factor is approximately 43%. With this pulse duty factor, the output stage of the switch mode regulator would be switched on for the first 43% of a clock period and switched off for the subsequent 57% of the clock period. An energy reservoir (e.g., a boost capacitor) is recharged in the off-time, i.e., when the output stage is switched off, and its charge is required again in the next period in order to switch on and/or hold a gate voltage of the output stage.

If the switch mode regulator is then operated close to the dropout region, i.e., if the input voltage is only slightly higher than the output voltage, the result is a pulse duty factor that approaches 100%. This operating state can occur in an automobile, for example, during the starting operation. This can cause a sharp drop in battery voltage.

If the charge state of the boost capacitor is not sufficiently high, the output stage can no longer be switched on in the subsequent clock period. The result thereof is then that the output voltage decreases, and the pulse duty factor is set by the regulator to 100%. As long as the boost capacitor does not have the necessary charge, however, the output stage cannot be switched on even when a pulse duty factor of 100% is set. Usually the boost capacitor is then recharged via an emergency current path. This mechanism does not engage, however, until the output voltage has decreased considerably and the pulse duty factor has been equal to 100% for some time, so that no further charge has also been taken from the boost capacitor for switch-on attempts or for unsuccessful switch-on operations. The result thereof is then that charge can no longer be taken from the boost capacitor for switch-on operations. This effect is perceptible as an undesired ripple or undesired oscillation in the output voltage, which makes the control circuit unstable.

SUMMARY

An example method according to the present invention for operating a switch mode regulator having a downstream circuit to which control is applied by a signal of the switch mode regulator and having an energy reservoir, such as a capacitor or a boost capacitor, that becomes charged when the downstream circuit is switched off, encompasses in principle the fact that the pulse duty factor of the signal is limited at an upper limit value in such a way that a predetermined charging time for the capacitor is available.

The example method according to the present invention may have the advantage that a switch mode regulator can be operated in stable fashion even close to the dropout voltage, by the fact that the pulse duty factor of the (pulse width modulated) signal, for example a (pulse width modulated) PWM signal or a square-wave signal, is limited at the top end at or by a limit value. This ensures that the capacitor can always make available the charge necessary for switching on and/or holding the gate voltage of the downstream circuit, for example of an output stage.

The predetermined charging time can be defined on the one hand on the basis of properties of the capacitor, for example capacitor capacitance or type, or on the other hand based on properties of the downstream circuit, for example a gate voltage. Gate voltages can be, for example, in the region of approximately 1.8 V for energy-optimized field effect transistors (FETs), approximately 10 V for metal oxide semiconductor field effect transistors (MOSFETs), or approximately 20 V for insulated gate bipolar transistors (IGBTs). Base currents that are usually in the μA range are required for control application to pure bipolar transistors. The charging time of a capacitor is calculated as C×U/I, i.e., the capacitance of the capacitor times the voltage divided by the current.

The capacitor used or dimensioned for the downstream circuit can be charged, on the basis of the predetermined charging time, to a charge state of between 50% and 100%, preferably between 70% and 90%, and particularly preferably between 90% and 100%.

Alternatively, provision can be made to define the predetermined charging time by way of a signal, for example via the pulse duty factor of the signal. Provision can thus be made to define the off-time of the limited signal as a fraction or a multiple of the clock cycle, of the pulse duty factor, or of the pulse duration of the signal.

Advantageously, the pulse duty factor can be set to a value between zero and the limit value, or to a value of 100%. A pulse duty factor of 100%, at which the output stage is continuously switched on, is thus still possible. As a result of the limitation, however, the pulse duty factor can no longer assume values between the limit value and 100%.

The pulse duty factor of every nth period of the signal can be limited. As described, the capacitor is recharged while the downstream circuit or output stage is switched off. The finite edge slope upon switching on and switching off shortens the charging time, however. The efficiency of the method can thus be enhanced if the pulse duty factor is limited in every nth period rather than in every period.

Advantageously, the off-time is correspondingly extended so that the effective pulse duty factor, averaged over n periods, remains the same. The available recharging time for the capacitor, averaged over n periods, thus becomes longer for n greater than 1 as compared with the recharging time for n equal to 1, for the same effective pulse duty factor limitation.

Advantageously, n can be selected to be equal to 3. This value has proven to be advantageous in practical use. Values from 2 to 5, in particular from 3 to 5, or up to less than 10, have also been shown to be advantageous.

The limit value can be calculated as $(n \times T - t_{off})/(n \times T)$, where T is the period length of the signal and $t_{off}$ is the time during which the downstream circuit is switched off or to be switched off. This is a calculation that can be performed simply and quickly, which is based inter alia on the desired off-time of the signal or on the time during which the downstream circuit is to be switched off.

Advantageously, the pulse duty factor is limited if the average pulse duty factor over n periods is higher than the limit value. Instead of limiting the pulse duty factor in fixed fashion at a specific period, for example at every third period for n equal to 3, provision can advantageously be made to limit the pulse duty factor only if the average pulse duty factor over a certain number of periods is higher than the limit value. This targeted activation of pulse duty factor limitation permits the method to be carried out efficiently.

The pulse duty factor can be limited in the nth period if the average pulse duty factor of the first to (n−1)th period is higher than the limit value. If the first to (n−1)th period exhibit a pulse duty factor higher than the limit value, it can be assumed that the nth period will also, with a certain probability, have a higher pulse duty factor. The result thereof is that the averaged pulse duty factor will be higher than the desired pulse duty factor limit. With this criterion, the limitation of the pulse duty factor can already be activated directly in the nth period. This has the advantage of fast reaction.

According to a further aspect of the present invention, a circuit for pulse duty factor limitation in a switch mode regulator having an output stage to which control is applied by a signal is configured in such a way that a pulse duty factor limiter is connected to the switch mode regulator in order to transfer the signal to the pulse duty factor limiter; the pulse duty factor limiter is configured to generate from the signal a limited signal limited at the top end in terms of pulse duty factor; and the pulse duty factor limiter is connected to the output stage in order to transfer the limited signal to the output stage. According to the present invention, the signal generated by the controller for application of control to the output stage, such as a pulse width modulated (PWM) signal or square-wave signal, is not used directly for control application to the output stage, but instead is first processed in a pulse duty factor limiter; in other words, a new signal is generated which is then used to apply control to the output stage. This simple structure allows integration even into previously existing systems, and easy planning of new systems.

The off-time of the limited signal can be dimensioned in such a way that a predetermined charging time for a capacitor of the output stage is made available. Generation of the limited signal, in particular of the non-active signal portion of the off-time, is optimized for charging a capacitor or holding a defined charge state when the output stage is switched off.

According to yet another aspect of the present invention, a motor vehicle encompasses an aforesaid circuit, the switch mode regulator being connected to a vehicle electrical system of the motor vehicle. The circuit according to the present invention is especially suitable for the particular requirements in the motor vehicle sector. The advantages and modifications described above moreover apply.

Advantageous refinements of the present invention are described below.

BRIEF DESCRIPTION OF THE DRAWINGS

Exemplifying embodiments of the present invention are explained in further detail with reference to the figures and to the description below.

DETAILED DESCRIPTION OF EXAMPLE EMBODIMENTS

Figure 1:
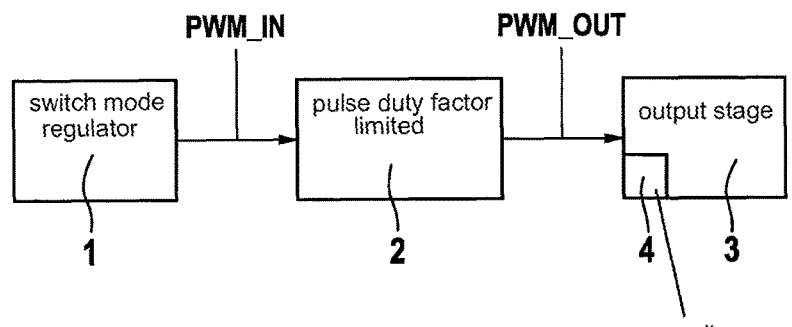
FIG. 1 is a block diagram of the pulse duty factor limitation system.
Figure 3:
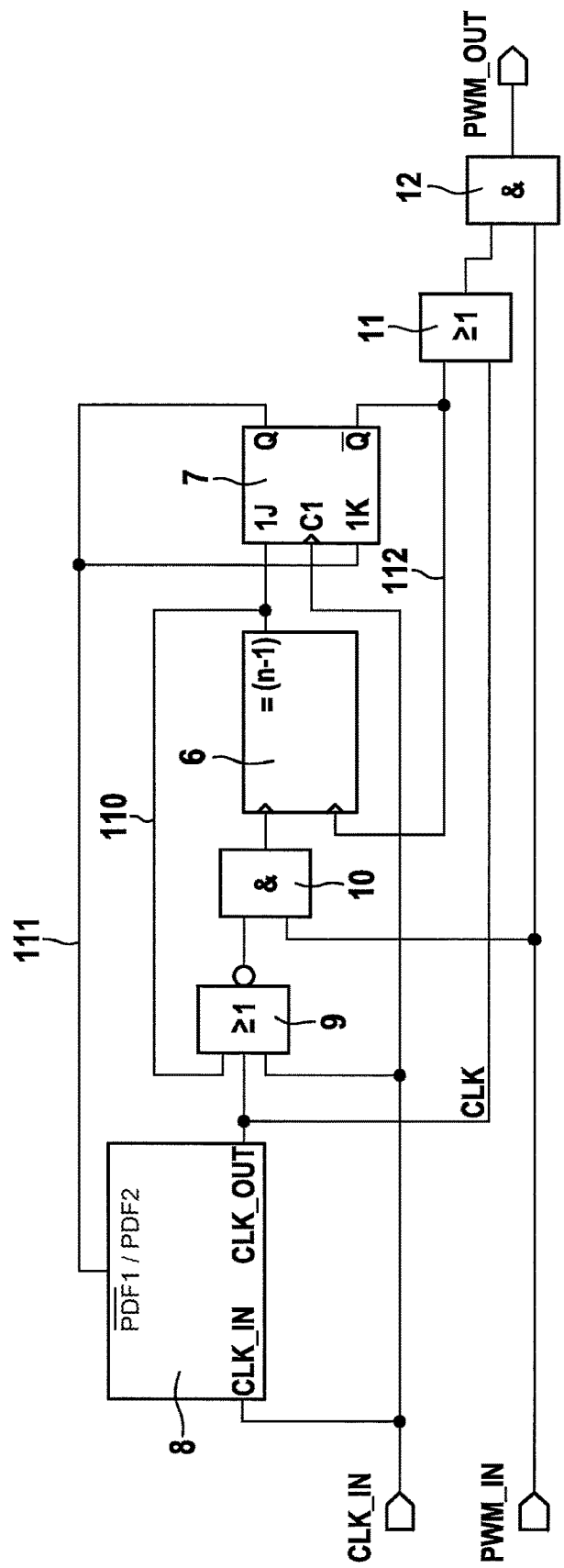
FIG. 3 is a circuit diagram of the circuit for pulse duty factor limitation.

FIG. 1 shows a pulse duty factor limitation system according to the present invention, in which a switch mode regulator 1 that can be operated, for example, as a down converter is connected to a pulse duty factor limiter 2 that contains a circuit, shown in FIG. 3, for pulse duty factor limitation. Switch mode regulator 1 outputs a signal, here a pulse width modulated signal PWM_IN, to pulse duty factor limiter 2. Pulse duty factor limiter 2 is connected to an output stage 3, for example of the switch mode regulator, and outputs a signal, here a pulse width modulated signal PWM_OUT, to output stage 3. A capacitor 4, for example in the form of a boost capacitor, is contained in output stage 3. The charge of the boost capacitor can be used to switch on the output stage or to hold a gate voltage of output stage 3. Output stage 3 is depicted here as an example of a downstream circuit.

Capacitor 4 can be contained, as depicted, in output stage 3 or in switch module regulator 1, or can be disposed separately from output stage 3 or from switch mode regulator 1. Output stage 3 and/or pulse duty factor limiter 2 can be a constituent of switch mode regulator 1.

Capacitor 4 becomes charged while output stage 3 is switched off. The charging time or recharging time $t_{ld}$ of capacitor 4 is shortened by the finite edge slope $t_{rf}$ as output stage 3 is switched on and off.

The recharging time $t_{ld}$ is thus calculated as $$t_{ld}=t_{off}-2\times t_{rf} \quad (1)$$

The pulse duty factor is now limited only every nth period, but conversely the off-time $t_{off}$ of output stage 3 is correspondingly lengthened. The effective pulse duty factor, averaged over n periods, thus remains the same.

An upper limit value for pulse duty factor limitation, or an effective pulse duty factor limit PDFL, is calculated as $$\text{PDFL}=(n\times T-t_{off})/(n\times T). \quad (2)$$

For the same effective pulse duty factor limit PDFL, the recharging time of the capacitor for n greater than 1 thus becomes longer, considered over n periods, as compared with the recharging time for n equal to 1. For example, if output stage 3 requires $t_{rf}=20$ ns to switch over at a switch mode regulator clock cycle of 1 MHz, which corresponds to a period length t=1 μs, the result for a limit value PDFL 95%, respectively at n=1 and n=3, is an off-time of $$t_{off,n=1}=n\times T\times(1-\text{PDFL})=1\times 1\ \mu s\times(1-0.95)=50\ \text{ns} \quad (3)$$

$$t_{off,n=3}=3\times 1\ \mu s\times(1-0.95)=150\ \text{ns} \quad (4)$$

with corresponding charging times of $$t_{ld,n=1}=t_{off,n=1}-2\times t_{rf}=50\ \text{ns}-2\times 20\ \text{ns}=10\ \text{ns} \quad (5)$$

$$t_{ld,n=3}=t_{off,n=3}-2\times t_{rf}=150\ \text{ns}-2\times 20\ \text{ns}=110\ \text{ns} \quad (6)$$

It is evident from this calculation that for the same effective pulse duty factor limit for each period, because of the longer charge duration, the greater n is, the more charge is available for switching on output stage 3. A value of n=3 has proven to be good in practice.

An external transistor can be used as a switch mode regulator output stage, i.e., the transistor is not integrated into the application-specific integrated circuit (ASIC) but instead is provided as a discrete component. The problem of charge retention by capacitor 4 then becomes more acute, because the edge slope of the external transistor cannot be controlled or specified to the same degree as with an internal switch mode regulator stage. The consequence thereof is that with an external transistor and for n=1, too long a recharging time for capacitor 4 has to be reserved. The pulse duty factor limit PDFL resulting therefrom would mean excessive irregularity in the adjustability of the pulse duty factor for the control circuit, which could in turn manifest itself as an undesired ripple or undesired oscillation in the output voltage.

Provision can therefore be made to apply pulse duty factor limitation only to every nth period. In the example (PDFL=95%, T=1 µs, and n=3) limitation to a pulse duty factor of 85% would therefore occur every third period, while every first and second period are not limited.

Figure 2:
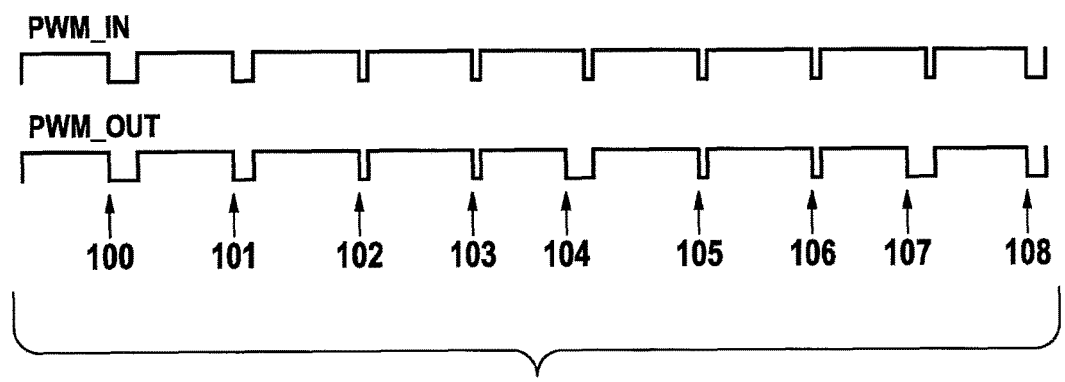
FIG. 2 is a diagram of the manner of operation of the pulse duty limitation system.

FIG. 2 depicts, by way of example, profiles of the PWM signal PWM_IN, i.e., the original PWM signal of regulator 1, and of the signal PWM_OUT, i.e., the PWM signal having a limited pulse duty factor. In the first two periods 100 and 101, the pulse duty factor PDF is lower than the limit value or the effective pulse duty factor limit PDFL. The two signals PWM_IN and PWM_OUT are therefore identical for the first two periods, since pulse duty factor limitation is not activated. The periods are labeled here at the off-time of the period: one period extends from a rising edge to the next rising edge.

In the third period 102 and fourth period 103, the pulse duty factor PDF is higher than the upper limit value PDFL for a first and a second period. Here as well, however, there is no limitation, since the number of periods whose pulse duty factor is higher than the limit value PDFL is still less than n, specifically is equal to 2. Pulse duty factor limitation takes effect only in the next period 104. This is evident from the fact that the signals PWM_IN and PWM_OUT are now different.

This period 104 is limited to a pulse duty factor of 85% so that, with maximum pulse duty factors of 100% in each of the two preceding periods 102, 103, a pulse duty factor of less than or equal to 95% (averaged over these three periods) can be achieved. The effective pulse duty factor does not need to equal exactly 95%, since the two preceding periods could have a pulse duty factor of less than 100%, which influences the average. The next three periods 105, 106, and 107 correspond to the periods 102, 103, and 104, so that the signal profiles are identical. In period 108 the pulse duty factor PDF is once again lower than the limit value or effective pulse duty factor limit PDFL.

Provision can be made to measure the exact pulse duty factors of the two preceding periods, or of all periods, so as thereby to exactly set the pulse duty factor of the period that is to be limited, thus resulting in an effective pulse duty factor of 95% or of another selected limit value.

The original PWM signal PWM_IN generated by regulator 1 is monitored for the decision as to when to activate pulse duty factor limitation. The pulse duty factor PDF of the respective nth period is limited only if the pulse duty factor PDF or the original PWM signal PWM_IN, averaged over n periods, is higher than the desired pulse duty factor limit PDFL or the limit value PDFL. In this example, therefore, every third period is limited to a pulse duty factor of 85% only if there have previously been periods whose pulse duty factor was so high that the pulse duty factor PDF of the original PWM signal PWM_IN, averaged over three periods, is higher than the desired pulse duty factor limit of 95%. The "third period" therefore does not need to be the third period of a sequence, but can instead be the third period having too high a pulse duty factor.

The assumption that if the first to (n−1)th periods have a pulse duty factor PDF higher than PDFL, then the nth period will also, with a certain probability, have a pulse duty factor PDF higher than PDFL, has proven to be appropriate in practice. It follows therefrom that the average pulse duty factor will be higher than the desired pulse duty factor limit. In this example (PDFL=95%, T=1 µs, and n=3) pulse duty factor limitation would therefore be activated in the third period if both the first and the second period each have a pulse duty factor PDF higher than 95%.

A circuit is correspondingly implemented with a counter that is incremented when the pulse duty factor PDF of a period is higher than the desired pulse duty factor limit or upper limit value PDFL. When the counter has reached a status of n−1, the nth period is limited in terms of its pulse duty factor to $(T-t_{off})/T$. It can be advantageous not to reset the counter if there have meanwhile been periods having a pulse duty factor PDF less than PDFL. This means that pulse duty factor limitation is activated for a period even when any two previous periods, and not just the two immediately preceding periods, each have a pulse duty factor PDF greater than PDFL (in this case 95%).

The following preliminary considerations are presented as preparation for the circuit implementation shown in FIG. 3. A clock signal $CLK_1$ having a pulse duty factor $PDF_1$=PDFL, with which the PWM signal generated by regulator 1 is compared, is used to evaluate whether the PWM signal PWM_IN generated by regulator 1 exceeds the desired pulse duty limit PDFL.

A clock signal $CLK_2$ having a pulse duty factor $PDF_2$, which can be calculated as follows from the off-time $t_{off}$ of output stage 3:

$$PDF_2=(T-t_{off})/T, \quad (7)$$

is additionally used to implement the above-described effective pulse duty factor limit PDFL.

In the example (PDFL=95%, T=1 µs, and n=3) provision is made for an off-time of $$t_{off}=n \times T \times (1-\text{PDFL})=3\times 1 \ \mu s \times (1-0.95)=150 \ ns \quad (8)$$

and thus a clock signal having a pulse duty factor of $$PDF_2=(1 \ \mu s-150 \ ns)/1 \ \mu s=85\%. \quad (9)$$

Advantageously, possible tolerances of pulse duty factors $PDF_1$ and $PDF_2$ are taken into account for dimensioning, in order to avoid excessive irregularity in the adjustability of the pulse duty factors for the control circuit. This is because excessive irregularity can manifest itself as an undesired ripple or undesired oscillation in the output voltage.

Because the two clock signals $CLK_1$ and $CLK_2$ are not used simultaneously, a common clock signal CLK whose pulse duty factor can be switched over between $PDF_1$ and $PDF_2$ can be used.

Circuit 5 for pulse duty factor limitation in a switch mode regulator will now be explained with reference to FIG. 3. Circuit 5 can be contained in pulse duty factor limiter 2 of FIG. 1. Central constituents of circuit 5 are a counter 6, a J-K flip-flop 7, and a clock generator 8. The circuit also contains several logic elements that will be explained in further detail below. Inputs of the circuit are the PWM signal PWM_IN deriving from regulator 1, as well as the clock signal CLK_IN; the output of circuit 5 is the limited PWM signal PWM_OUT, which is outputted from pulse duty factor limiter 2 to output stage 3.

Figure 4:
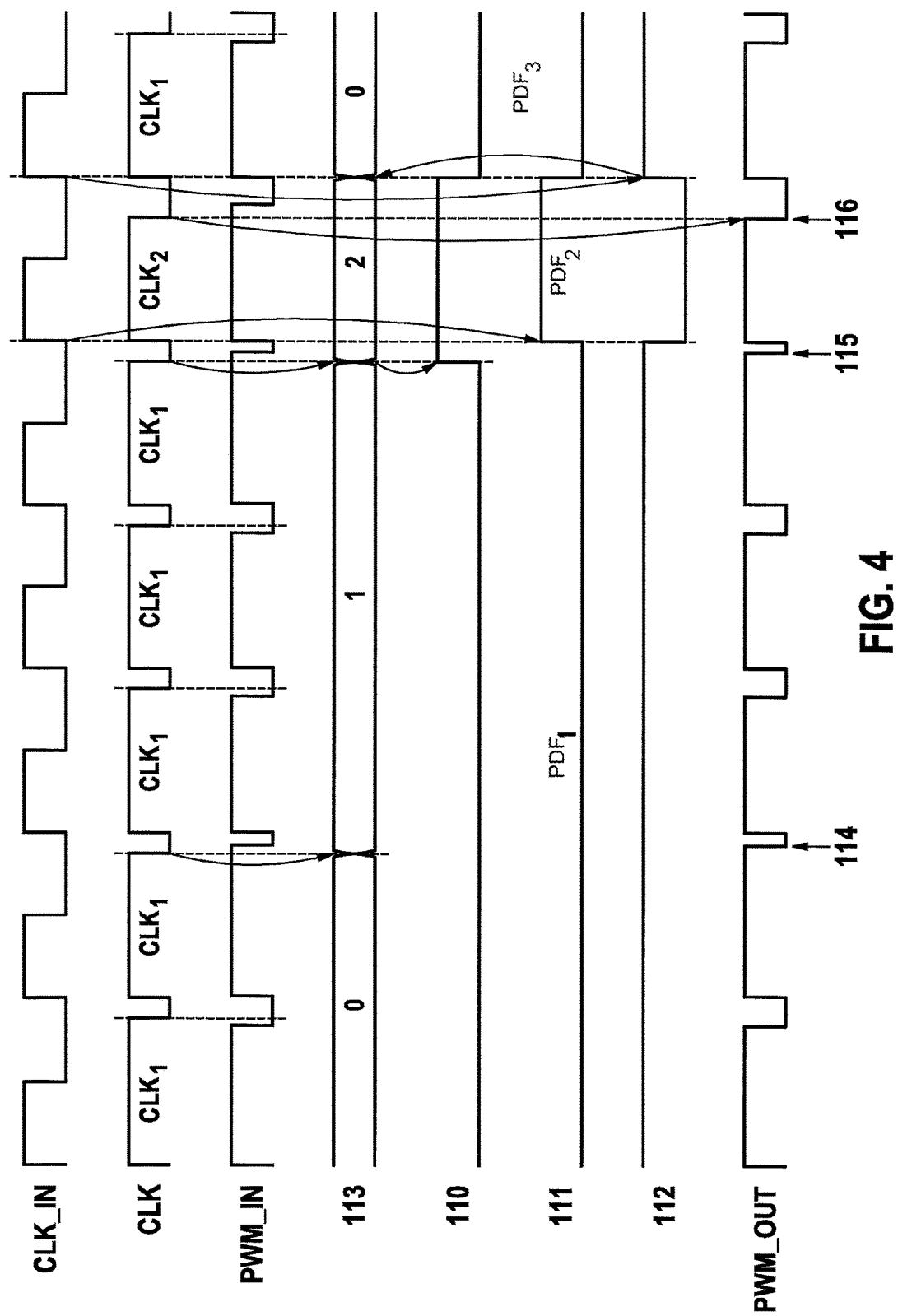
FIG. 4 shows examples of signal profiles of the circuit of FIG. 3.

Examples of signal profiles for circuit 5 are depicted in FIG. 4 and will be explained in conjunction with the discussion of FIG. 3. The signal profiles or signals can exhibit different shapes or correlations, for example trapezoidal signal shapes.

At the beginning of this discussion, counter 6 and J-K flip-flop 7 are set to zero or erased. The result thereof is that the signal 110 (which can also be referred to as EQN), which is present at the =(n−1) output of counter 6, is equal to zero. The output of counter 6 is connected to the J input of J-K flip-flop 7. Clock input C1 of J-K flip-flop 7 is connected to clock input CLK_IN of circuit 5. Because of the zeroing or erasure, the signal 111 at the Q output of J-K flip-flop 7 is also equal to zero. The signal 111 can also be referred to as PDF_SEL, since switchover between the pulse duty factors PDF1 and PDF2 is effected with this signal. The signal 111 is fed back to the K input of J-K flip-flop 7. The $\overline{Q}$ output of J-K flip-flop 7, at which the signal 112 or RST_CNT is outputted, is connected to reset input R of counter 6 and serves to reset counter 6.

The signal 111, with which switchover between the pulse duty factors PDF1 and PDF2 is effected, is connected to clock generator 8. The input clock CLK_IN is applied to a clock input CLK_IN of clock generator 8. Because 111=0, the clock signal CLK=CLK1 is generated from the clock signal CLK_IN by clock generator 8, and made available at its output CLK_OUT. The clock signal CLK1 has a pulse duty factor PDF1.

The clock output of clock generator 8, the output of counter 6, and the clock input CLK_IN are connected to a NOR gate 9. NOR gate 9 outputs a signal to an AND gate 10 when all three inputs have a signal level of 0. The second input of AND gate 10 is connected to the input signal PWM_IN. The output of AND gate 10 is connected to increment input I of counter 6.

If the original PWN signal PWM_IN is still set during the falling edge of CLK (PWM_IN=1), the pulse duty factor PDF of the current period 114 of the PWM signal PWM_IN is therefore higher than the desired pulse duty factor limit PDFL. In this case the count status 113 of counter 6 is incremented by 1 with the falling edge of CLK, provided it is less than n−1 before the increment. The periods are labeled here at the off-time of the period: one period extends from a rising edge to the next rising edge.

Once counter 6 has reached a counter status n−1, possibly after repeated counting, then in period 115 the output signal 110 of counter 6 is set to 1. J-K flip-flop 7 is then set with the rising edge of CLK, so that the signal 111=1 is set at the Q output of J-K flip-flop 7. Clock generator 8 thus generates from the clock signal CLK_IN, in the current period, the clock signal CLK=CLK2 having the pulse duty factor PDF=PDF2.

Because J-K flip-flop 7 is set, the signal RST_CNT outputted at the $\overline{Q}$ output is equal to zero, the result being that OR gate 11 allows the clock signal CLK=CLK to pass to an AND gate 12. In AND gate 12, the clock signal CLK=CLK2 is combined with the original PWM signal PWM_IN and thus appears in period 116, with the falling edge of CLK, as a limited PWM signal PWM_OUT at output PWM_OUT of circuit 5.

J-K flip-flop 7 is reset again with the next rising edge of clock signal CLK, since inputs J and K are equal to 1. The result thereof is that the two output signals 111=0 and 112=1 are set. Counter 6 is also set back to zero with the rising edge of 112. Circuit 5 is thus once again in the state it was in at the beginning of the discussion.

What is claimed is:

1. A method for operating a switch mode regulator, comprising:
    applying control to a downstream circuit by a signal of the switch mode regulator, a capacitor being charged when the downstream circuit is switched off; and
    limiting a pulse duty factor of the signal at an upper limit value in such a way that a predetermined charging time for the capacitor is available.

2. The method as recited in claim 1, wherein the pulse duty factor is set to a value between zero and the upper limit value, or to a value of 100%.

3. The method as recited in claim 1, wherein the pulse duty factor is limited if an average pulse duty factor over n periods is higher than the limit value.

4. A method for operating a switch mode regulator, comprising:
    applying control to a downstream circuit by a signal of the switch mode regulator, a capacitor being charged when the downstream circuit is switched off; and
    limiting a pulse duty factor of the signal at an upper limit value in such a way that a predetermined charging time for the capacitor is available,
    wherein the pulse duty factor of every nth period of the signal is limited.

5. The method as recited in claim 4, wherein 2≤n≤5.

6. The method as recited in claim 5, wherein n is equal to 3.

7. A method for operating a switch mode regulator, comprising:
    applying control to a downstream circuit by a signal of the switch mode regulator, a capacitor being charged when the downstream circuit is switched off; and
    limiting a pulse duty factor of the signal at an upper limit value in such a way that a predetermined charging time for the capacitor is available,
    wherein the upper limit value is calculated as $(n \times T - t_{off})/(n \times T)$, where T is a period length of the signal and $t_{off}$ is a switched-off time of the downstream circuit.

8. A method for operating a switch mode regulator, comprising:
    applying control to a downstream circuit by a signal of the switch mode regulator, a capacitor being charged when the downstream circuit is switched off; and
    limiting a pulse duty factor of the signal at an upper limit value in such a way that a predetermined charging time for the capacitor is available,
    wherein the pulse duty factor of every nth period of the signal is limited,
    wherein 2≤n≤5,
    wherein the pulse duty factor is limited in the nth period if the average pulse duty factor of the first to (n−1)th period is higher than the limit value.

9. A circuit for pulse duty factor limitation in a switch mode regulator, comprising:
    an output stage to which control is applied by a signal; and
    a pulse duty factor limiter connected to the switch mode regulator to transfer the signal to the pulse duty factor limiter, the pulse duty factor limiter being configured to generate from the signal a limited signal limited at a top end in terms of pulse duty factor;
    wherein the pulse duty factor limiter is connected to the output stage to transfer the limited signal to the output stage.

10. The circuit as recited in claim 9, wherein an off-time of the limited signal is dimensioned in such a way that a predetermined charging time for a capacitor of the output stage is made available.

11. A motor vehicle comprising:
- a vehicle electrical system;
- a switch mode regulator connected to the vehicle electrical system; and
- a circuit for pulse duty factor limitation in the switch mode regulator, the circuit including:
  - an output stage to which control is applied by a signal; and
  - a pulse duty factor limiter connected to the switch mode regulator to transfer the signal to the pulse duty factor limiter, the pulse duty factor limiter being configured to generate from the signal a limited signal limited at a top end in terms of pulse duty factor;
- wherein the pulse duty factor limiter is connected to the output stage to transfer the limited signal to the output stage.

* * * * *